US012697819B2

(12) United States Patent (10) Patent No.: US 12,697,819 B2

Suzuki et al. (45) Date of Patent: Aug. 4, 2026

(54) PIGMENT DISPERSION FOR INK JET INK, INK JET INK, AND PRINTED MATTER

(71) Applicant: DIC Corporation, Tokyo (JP)

(72) Inventors: Naruhito Suzuki, Sakura (JP); Takashi Nishijima, Sakura (JP); Minoru Shigemori, Sakura (JP); Iwao Hattori, Sakura (JP)

(73) Assignee: DIC CORPORATION, Tokyo (JP)

( * ) Notice: Subject to any disclaimer, the term of this patent is extended or adjusted under 35 U.S.C. 154(b) by 18 days.

(21) Appl. No.: 18/560,023

(22) PCT Filed: May 19, 2022

(86) PCT No.: PCT/JP2022/020760

§ 371 (c)(1),
(2) Date: Nov. 9, 2023

(87) PCT Pub. No.: WO2022/249959

PCT Pub. Date: Dec. 1, 2022

(65) Prior Publication Data

US 2024/0227411 A1 Jul. 11, 2024

(30) Foreign Application Priority Data

May 27, 2021 (JP) ................................. 2021-089115

(51) Int. Cl.
| | |
|---|---|
| *C09D 11/30* | (2014.01) |
| *B41J 2/21* | (2006.01) |
| *B41J 3/407* | (2006.01) |
| *B41M 5/00* | (2006.01) |
| *C09D 11/102* | (2014.01) |
| *C09D 11/104* | (2014.01) |
| *C09D 11/322* | (2014.01) |
| *C09D 11/38* | (2014.01) |

(52) U.S. Cl.
CPC .............. *B41J 2/211* (2013.01); *B41J 3/407* (2013.01); *B41M 5/0047* (2013.01); *B41M 5/0064* (2013.01); *C09D 11/102* (2013.01); *C09D 11/104* (2013.01); *C09D 11/30* (2013.01); *C09D 11/322* (2013.01); *C09D 11/38* (2013.01)

(58) Field of Classification Search
CPC ........ B41J 2/211; B41J 3/407; B41M 5/0047; B41M 5/0064; C09D 11/102; C09D 11/104; C09D 11/30; C09D 11/322; C09D 11/38
See application file for complete search history.

(56) References Cited

U.S. PATENT DOCUMENTS

| | | | |
|---|---|---|---|
| 11,130,349 B2 | 9/2021 | Sakaguchi et al. | |
| 2004/0085419 A1 | 5/2004 | Yau et al. | |
| 2012/0164400 A1* | 6/2012 | Nagahama ............. | C09D 11/30 |
| | | | 428/195.1 |
| 2012/0223999 A1 | 9/2012 | Kraiter et al. | |
| 2015/0259553 A1 | 9/2015 | Nakagawa et al. | |
| 2017/0022380 A1 | 1/2017 | Nakagawa et al. | |
| 2017/0022381 A1 | 1/2017 | Takamura et al. | |
| 2017/0121545 A1 | 5/2017 | Nagashima et al. | |
| 2017/0174919 A1 | 6/2017 | Kido et al. | |
| 2019/0345356 A1* | 11/2019 | Kido .................... | C09D 11/322 |
| 2020/0307246 A1 | 10/2020 | Hatta et al. | |

FOREIGN PATENT DOCUMENTS

| | | | | |
|---|---|---|---|---|
| CN | 102471620 A | 5/2012 | | |
| JP | 2004-149806 A | 5/2004 | | |
| JP | 2004175918 A * | 6/2004 | ............. | C09D 11/00 |
| JP | 2013510929 A * | 3/2013 | ............. | C09D 11/00 |
| JP | 2015-063582 A | 4/2015 | | |
| JP | 2017-88839 A | 5/2017 | | |
| JP | 2017088839 A * | 5/2017 | ............. | C09D 11/30 |
| JP | 6295825 B2 | 3/2018 | | |
| JP | 2020-169232 A | 10/2020 | | |
| JP | 2020-193269 A | 12/2020 | | |
| JP | 2022-61609 A | 4/2022 | | |
| WO | 2016/199391 A1 | 12/2016 | | |

OTHER PUBLICATIONS

International Search Report dated Jul. 26, 2022, issued in counterpart International Application No. PCT/JP2022/020760 (2 pages).

Yan, S. et al., Coating Resin Chemistry, p. 16-17, 2007, with English translation. (9 pages); Cited in CN Office Action dated Nov. 19, 2025.

Yang, C. et al., Polymer Materials Preparation Engineering Experiment, p. 120, 2020, with English translation. (9 pages); Cited in CN Office Action dated Nov. 19, 2025.

* cited by examiner

*Primary Examiner* — Yaovi M Ameh

(74) *Attorney, Agent, or Firm* — WHDA, LLP

(57) ABSTRACT

The present invention relates to a pigment dispersion for ink jet ink, including a binder (A), a pigment (B), and an aqueous medium (C). The pigment dispersion is characterized in that the binder (A) is a binder containing a urethane resin (A1) which is a reaction product of polyol (a1), containing polyol (a1-1) having an acid group and polyester polyol (a1-2) other than the polyol (a1-1), with polyisocyanate (a2) containing polyisocyanate (a2-1) having a ring structure, the acid groups possessed by the urethane resin (A1) are partially or entirely neutralized, and the glass transition temperature of the urethane resin (A1) is 70° C. or less.

12 Claims, No Drawings

PIGMENT DISPERSION FOR INK JET INK, INK JET INK, AND PRINTED MATTER

TECHNICAL FIELD

The present invention relates to a pigment dispersion used for ink jet ink application, an ink jet ink prepared by using the pigment dispersion, and a printed matter printed by ink jet printing using the ink jet ink.

BACKGROUND ART

From the concept of occupational safety and health and flammability explosibility in addition to the viewpoint of sustainability on the background of worsening of air pollution by VOC and global expansion of global warming and the like, there is a move to shift to de-petroleum resources, and restriction on the use of organic solvents increasingly becomes strict. Therefore, in the industry of printing inks, an aqueous ink is developed by replacing an organic solvent of a solvent-based printing ink with water, and an aqueous ink is also required to be developed and improved as an ink jet ink.

On the other hand, the consumption amount of film packages of plastic films is on the increase worldwide due to increases in population and increases in income levels and logistics system changes, and accordingly the amount of production of inks for packages increases year by year.

The mainstream in printing on a film substrate have been a solvent-based flexo ink or a solvent-based gravure ink. However, this printing method requires plate making and thus has the problem of increasing cost and requiring time to printing. Therefore, even in printing on film packages, there is growing demand for ink jet printing which has no need for plate making and is capable of on-demand printing.

However, in comparison with a solvent-based ink jet ink, an aqueous ink jet ink has the problem of still insufficient anti-blocking property accompanied with printed pattern offset, rubbing resistance, or laminate strength of films laminated using an adhesive applied to a printing surface. In addition, these problems are more remarkable when a substrate is a film substrate.

CITATION LIST

Patent Literature

PTL 1: Japanese Patent No. 6295825

SUMMARY OF INVENTION

Technical Problem

Patent Literature 1 discloses an ink jet ink using polycarbonate-based urethane resin particles having a minimum film-forming temperature of 25° C. or more, the ink having good drying properties and rubbing resistance for a nonporous substrate. However, in the invention described in Patent Literature 1, a laminate strength test is not performed, and laminate strength is required to be further improved for development to package application.

A problem to be solved by the present invention relates to an aqueous ink jet ink having excellent anti-blocking property, rubbing resistance, and laminate strength, a pigment dispersion which enables to prepare the ink jet ink, and a printed matter printed by ink jet printing with the ink jet ink.

Solution to Problem

As a result of earnest research for solving the problem, the inventors found that the problem can be solved by a pigment dispersion using a specific urethane resin as a binder, leading to the achievement of the present invention.

That is, the present invention relates to the following invention.

(1) A pigment dispersion for ink jet, containing a binder (A), a pigment (B), and an aqueous medium (C), in which the binder (A) is a binder containing a urethane resin (A1) which is a reaction product of polyol (a1), containing polyol (a1-1) having an acid group and polyester polyol (a1-2) other than the polyol (a1-1), with polyisocyanate (a2) containing polyisocyanate (a2-1) having a ring structure;

the acid groups possessed by the urethane resin (A1) are partially or entirely neutralized; and the glass transition temperature of the urethane resin (A1) is 70° C. or less.

(2) The pigment dispersion for ink jet ink of (1), in which the acid value of the urethane resin (A1) is 10 to 40 mgKOH/g.

(3) The pigment dispersion for ink jet ink of (1) or (2), in which the content of the binder (A) is 5% to 30% by mass in the total amount of the pigment dispersion.

(4) The pigment dispersion for ink jet ink of any one of (1) and (2), the pigment dispersion being used for printing on a plastic substrate.

(5) An ink jet ink using the pigment dispersion for ink jet ink of any one of (1) to (4).

(6) A printed matter printed with the ink jet ink of (5).

Advantageous Effects of Invention

According to the present invention, an aqueous ink jet ink having excellent anti-blocking property, rubbing resistance, and laminate strength can be obtained.

DESCRIPTION OF EMBODIMENTS

A "pigment dispersion for an ink jet ink" of the present invention (may be simply referred to as a "pigment dispersion" or a "dispersion" hereinafter) contains a binder (A), a pigment (B), and an aqueous medium (C). Hereinafter, the "binder (A)" may be referred to as the "(A) component", and the other components may be referred in the same manner.

The pigment dispersion of the present invention is produced as an intermediate product for an ink jet ink and is used as an aqueous ink jet ink for ink jet printing after being diluted.

Binder (A)

The binder (A) contains a urethane resin (A1), and the urethane resin (A1) is the reaction product of polyol (a1) and polyisocyanate (a2).

(Urethane resin (A1))

In the present invention, the urethane resin (A1) is a resin obtained by reacting the polyol (a1) with the polyisocyanate (a2). The resin is obtained by polymerizing the (a1) component with the (a2) component by a known method such as radical polymerization or the like in the presence of an any desired polymerization initiator. The resin (A1) contains an acid group, and thus the urethane resin (A1) is imparted with hydrophilicity, thereby enabling the pigment (B) to be stably dispersed in water.

Polyol (a1)

In the present invention, the polyol (a1) contains polyol (a1-1) having an acid group and polyester polyol (a1-2) other than the polyol (a1-1).

In the polyol (a1-1) having an acid group, examples of the acid group include a carboxyl group, a sulfonate group, a phosphate group, a thiocarboxyl group, and the like, and carboxyl group or a sulfonate group is preferred.

Examples of polyol having a carboxyl group include 2,2-dimethylolpropionic acid, 2,2-dimethylolbutanoic acid, 2,2-dimethylolvaleric acid, and the like. Among these, 2,2-dimethylolpropionic acid, and 2,2-dimethylolbutanoic acid are preferred because of good dispersion stability. Also, polyester polyol having a carboxyl group produced by reacting polyols having a carboxyl group with various polycarboxylic acids can be used. These polyols having a carboxyl group can be used alone or in combination of two or more.

Examples of polyol having a sulfonate group include polyester polyols produced by reacting dicarboxylic acids or salts thereof, such as 5-sulfoisophthalic acid, sulfotereph-thalic acid, 4-sulfophthalic acid, 5-(4-sulfophenoxy) isoph-thalic acid, and the like, with low molecular polyols, such as ethylene glycol, propylene glycol, 1,4-butanediol, 1,6-hexanediol, diethylene glycol, neopentyl glycol, and the like. These polyols having a sulfonate group can be used alone or in combination of two or more.

The polyol (a1-1) having an acid group is preferably used within a range in which the acid value of the urethane resin (A1) is 10 to 30 mgKOH/g and more preferably used within a range in which the acid value is 10 to 28 mgKOH/g. In the present invention, the acid value is a theoretical value calculated based on the use amount of acid group-containing compound, such as the polyol (a1-1) having an acid group, used for producing the urethane resin (A1).

In the present invention, the acid groups in the polyol (a1-1) having an acid group are partially or entirely neu-tralized. When the acid groups are partially or entirely neutralized, good water dispersibility can be exhibited.

A neutralization method is not particularly limited, but is, for example, neutralization using a metal or organic amine.

The metal used for neutralization is not particularly limited, but a metal salt is preferably formed by neutraliza-tion with metal ion of sodium, potassium, calcium, copper, lithium, or the like. In addition, a metal salt may be formed by at least partially neutralizing the acid groups.

The metal ion of sodium, potassium, calcium, copper, lithium, or the like used for neutralizing the acid groups can be produced from metal hydroxides such as sodium hydrox-ide, potassium hydroxide, lithium hydroxide, and the like, metal chlorides such as sodium chloride, potassium chloride, and the like, and metal sulfides such as copper sulfate and the like.

Examples of the organic amine used for neutralization include polyalkyleneimine, polyallylamine, (poly)methyl-ene polyamine, alkanolamine, and alkylamine.

Among these, alkylamine is preferred from the viewpoint of pigment dispersibility.

The polyalkyleneimine is preferably polyalkyleneimine having an alkylene group having 2 or more and 5 or less of carbon atoms, more preferably polyalkyleneimine having an alkylene group having 2 or more and 4 or less of carbon atoms, still more preferably polyethyleneimine or polypro-pyleneimine, and particularly preferably polyethyleneimine. One or two or more of these may be used.

The number-average molecular weight of the polyalkyle-neimine is preferably 150 or more, more preferably 500 or more, still more preferably 800 or more, and even still more preferably 1000 or more, and is preferably 10000 or less, more preferably 5000 or less, and still more preferably 4000 or less.

The polyallylamine is, for example, a polymer having an amino group in a side chain, such as a homopolymer or copolymer of an allyl compound such as allylamine, dim-ethylallylamine, or the like.

The weight-average molecular weight of the polyallylam-ine is preferably 800 or more, more preferably 1000 or more, and still more preferably 1500 or more, and is preferably 10000 or less, more preferably 5000 or less, and still more preferably 4000 or less.

Examples of the (poly)ethylene polyamine include ethyl-enediamine, diethylenetriamine, triethylenetetramine, tetra-ethylenepentamine, pentaethylenehexamine, and the like. Among these, ethylenediamine, diethylenetriamine, trieth-ylenetetramine, and tetraethylenepentamine are preferred, and ethylenediamine is particularly preferred.

The alkanolamine is preferably alkanolamine having 2 or more and 9 or less of carbon atoms. Examples of the alkanolamine include primary alkanolamines such as mono-ethanolamine, monopropanolamine, monobutanolamine, and the like; secondary alkanol amines such as monoalkanol secondary amines, such as N-methylethanolamine, N-meth-ylpropanolamine and the like, dialkanol secondary amines such as diethanolamine, diisopropanolamine, and the like; and tertiary alkanol amines such as monoalkanol tertiary amines, such as N,N-dimethylethanolamine, N,N-dimethyl-propanolamine, N,N-diethylethanolamine, and the like, dial-kanol tertiary amine such as N-methyldiethanolamine, N-ethyldiethanolamine, and the like, alkanol tertiary amines such as triethanolamine, triisopropanolamine, and the like; and the like. Among these, tertiary alkanol amines having 2 or more and 9 or less of carbon atoms are preferred, and triisopropanolamine is particularly preferred.

The alkylamine is preferably an alkylamine having 1 or more and 6 or less of carbon atoms. Examples of the alkylamine include primary mines such as propylamine, butylamine, hexylamine, and the like; secondary amines such as diethylamine, dipropylamine, and the like; and tertiary amines such as triethylamine and the like.

The polyester polyol (a1-2) is polyester polyol not cor-responding to the polyol (a1-1), and the use of the polyester polyol (a1-2) allows the control of polarity and Tg value due to the presence of an ester group in the structure. Thus, proper flexibility and adhesion to the substrate can be imparted to the urethane resin (A1), and consequently laminate strength and rubbing resistance can be improved.

The polyester polyol (a1-2) is the reaction product (poly-condensate) produced by reaction (for example, polycon-densation reaction) of polyvalent carboxylic acid with poly-hydric alcohol, and the polyester polyol has a structural unit derived from the polyvalent carboxylic acid and a structural unit derived from the polyhydric alcohol.

Examples of the polyvalent carboxylic acid include phthalic acid, isophthalic acid, terephthalic acid, adipic acid, maleic acid, fumaric acid, succinic acid, oxalic acid, malonic acid, glutaric acid, pimelic acid, suberic acid, azelaic acid, sebacic acid, dimer acid, trimellitic acid, benzene tetracar-boxylic acid, benzene pentacarboxylic acid, benzene hexac-arboxylic acid, and the like.

Examples of polyhydric alcohol include glycols such as ethylene glycol, propylene glycol, 1,3-propanediol, 1,4-butanediol, 1,5-pentanediol, 1,6-hexanediol, diethylene glycol, triethylene glycol, tetraethylene glycol, dipropylene glycol, tripropylene glycol, 1,4-cyclohexanediol, 1,4-cyclohexane dimethanol, and the like; glycols having a branched structure, such as 2-methyl-1,5-pentanediol, 3-methyl-1,5-pentanediol, 1,2-butanediol, 1,3-butanediol, 2-butyl-2-ethyl-1,3-propanediol, 1,2-propanediol, 2-methyl-1,3-propanediol, neopentyl glycol, 2-isopropyl-1,4-butanediol, 2,4-dimethyl-1, 5-pentanediol, 2, 4-diethyl-1,5-pentanediol, 2-ethyl-1, 3-hexaneddiol, 2-ethyl-1,6-hexanediol, 3,5-heptanediol, 2-methyl-1, 8-octanediol, and the like; glycerin, trimethylolpropane, trimethylolethane, pentaerythritol, sorbitol, and the like.

Because of good compatibility with the pigment (B), the number-average molecular weight of the polyester polyol (a1-2) is preferably within a range of 500 to 8,000, more preferably within a range of 800 to 7,000, and still more preferably within a range of 900 to 6,000. In the present invention, the number-average and weight-average molecular weights represent values measured by a gel permeation chromatography (GPC) method.

The polyol (a1) may contain polyol other than the polyol (a1-1) having an acid group and the polyester polyol (a1-2). For example, polyether polyol, polycarbonate polyol, or polyol having a ring structure other than the above may be contained.

Polyisocyanate (a2)

The polyisocyanate (a2) contains polyisocyanate (a2-1) having a ring structure.

Examples of the ring structure include aliphatic ring structures such as a cyclobutyl ring, a cyclopentyl ring, a cyclohexyl ring, a cycloheptyl ring, a cyclooctyl ring, a propyl cyclohexyl ring, a tricyclo [5.2.1.0.2.6] decyl skeleton, a bicyclo [4.3.0]-nonyl skeleton, a tricyclo [5. 3.1.1] dodecyl skeleton, a propyl tricyclo [5.3.1.1. ]dodecyl skeleton, a norbornene skeleton, an isobornyl skeleton, a dicyclopentanyl skeleton, an adamantyl skeleton, and the like; and aromatic ring structures such as a benzene ring, a naphthalene ring, and the like.

Examples of the polyisocyanate (a2-1) having an aliphatic ring structure include cyclohexane diisocyanate, hydrogenated xylylene diisocyanate, isophorone diisocyanate, dicyclohexylmethane diisocyanate, and the like.

Examples of the polyisocyanate (a2-1) having an aromatic ring structure include 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, naphthalene diisocyanate, xylylene diisocyanate, tetramethylxylylene diisocyanate, and the like.

Among these, tolylene diisocyanate or isophorone diisocyanate is preferred, and tolylene diisocyanate is particularly preferred.

These polyisocyanates (a2-1) can be used alone or in combination of two or more.

The polyisocyanate (a2) may contain an isocyanate compound (a2-2) other than the polyisocyanate (a2-1) having a ring structure.

Polyol not having a ring structure, for example, aliphatic polyisocyanate such as hexamethylene diisocyanate, lysine diisocyanate, or the like may be used in combination as the isocyanate compound (a2-2) other than (a2-1).

A method for producing the urethane resin (A1) obtained by reacting the polyol (a1) with the polyisocyanate (a2) is, for example, a method of mixing the polyol (a1) and the polyisocyanate (a2) and reacting them within a reaction temperature range of about 50° C. to 150° C. in the absence of a solvent or in the presence of an organic solvent.

The reaction of the polyol (a1) with the polyisocyanate (a2) is preferably performed so that the equivalent ratio of isocyanate groups of the polyisocyanate (a2) to hydroxyl groups of the polyol (a1) is within a range of 0.8 to 2.5 and more preferably within a range of 0.9 to 1.5.

The urethane resin (A1) inevitably has, in its resin structure, a ring structure derived from the polyisocyanate (a2-1) having a ring structure. In addition, when the polyol (a1) has polyol having a ring structure, an aliphatic ring structure derived from the polyol constitutes the urethane resin (A1). When the urethane resin (A1) has an aliphatic ring structure, rubbing resistance can be improved.

The ring structure is preferably present within a range of 500 to 5000 mmol/kg, more preferably 600 to 4000 mmol/kg, still more preferably 800 to 3500 mmol/kg, and particularly preferably 800 to 2000 mmol/kg, relative to the whole of the urethane resin (A1).

In the present invention, the ratio of the aliphatic ring structure contained in the urethane resin (A1) relative to the whole of the urethane resin (A1) is a theoretical value calculated based on the total mass of all raw materials, such as the polyol (a1) , the polyisocyanate (a2), etc., used for producing the urethane resin (A1), and the material amount of the ring structure possessed by the ring structure-containing compound used for producing the urethane resin (A1).

Also, if required, a chain extender can be used in producing the urethane resin (A1).

Examples of the chain extender include polyamine, a hydrazine compound, and other compounds having an active hydrogen atom. These chain extenders can be used alone or in combination of two or more.

Examples of the polyamine include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4, 4'-dicyclohexylmethanediamine, 1,4-cyclohexanediamine, and the like; N-hydroxymethyl aminoethylamine, N-hydroxyethyl aminoethylamine, N-hydroxypropyl aminopropylamine, N-ethylaminoethylamine, N-methylaminopropylamine, diethylenetriamine, dipropylenetriamine, triethylenetetramine, and the like. Among these, piperazine or ethylenediamine is preferred.

Examples of the hydrazine compound include hydrazine, N,N'-dimethylhydrazine, 1,6-hexamethylene bishydrazine, succinic dihydrazide, adipic dihydrazide, glutaric dihydrazide, sebacic dihydrazide, isophthalic dihydrazide, β-semicarbazide propionic acid hydrazide, 3-semicarbazide-propyl-carbazte ester, semicarbazide-3-semicarbazidemethyl-3, 5,5-trimethylcyclohexane, and the like. Among these, hydrazine is preferred.

Examples of the other compounds having an active hydrogen include glycols such as ethylene glycol, diethylene glycol, triethylene glycol, propylene glycol, 1,3-propanediol, 1,3-butanediol, 1,4-butanediol, hexamethylene glycol, sucrose, methylene glycol, glycerin, sorbitol, and the like; phenols such as bisphenol A, 4,4'-dihydroxydiphenyl, 4,4'-dihydroxydiphenyl ether, 4,4'-dihydroxydiphenyl sulfone, hydrogenated bisphenol A, hydroquinone, and the like; water; and the like.

Examples of an organic solvent which can be used for producing the urethane resin (A1) include ketone solvents such as acetone, methyl ether ketone, and the like; ether solvents such as tetrahydrofuran, dioxane, and the like; acetate ester solvents such as ethyl acetate, butyl acetate, and the like; nitrile solvents such as acetonitrile and the like; amide solvents such as dimethylformamide, N-methylpyrrolidone, and the like. These organic solvents can be used alone or in combination of two or more.

The glass transition temperature (Tg) of the urethane resin (A1) is 70° C. or less, preferably 50° C. or less, and more preferably 40° C. or less. With Tg within this range, the good anti-blocking property can be obtained.

From the viewpoint of improving energy efficiency by decreasing the drying temperature in producing a printed matter, the minimum film-forming temperature (MFT) of the urethane resin (A1) is preferably 40° C. or less, more preferably 35° C. or less, and still more preferably 33° C. or less.

In addition, with respect to the organic solvent, in order to attempt to decrease the load on safety and environment, the organic solvent may be partially or entirely removed by, for example, distillation under reduced pressure during or after the production of the urethane resin (A1).

Because the durability of a printed matter can be exhibited, the urethane resin (A1) produced by the method described above having a mass-average molecular weight within a range of 5,000 to 500,000 is preferably used, the urethane resin having a mass-average molecular weight within a range of 5,000 to 200,000 is more preferably used, and the urethane resin having a mass-average molecular weight within a range of 20, 000 to 100, 000 is still more preferably used.

In the present invention, the weight-average molecular weight (in terms of polystyrene) is measured by GPC (gel permeation chromatography) using HLC8220 system manufactured by Tosoh Corporation under the following conditions.

Separation column: using four columns of TSKgel GMHHR-N manufactured by Tosoh Corporation Moving layer: tetrahydrofuran manufactured by Wako Pure Chemical Corporation Flow rate: 1.0 ml/min, Sample concentration: 0.4 mass %

Sample injection amount: 100 microliters

Detector: differential refractometer

The mass-average molecular weight is preferably 5,000 or more because there is a tendency that not only the durability of a printed matter is improved, but also various problems such as blocking due to a drying defect and the like hardly occur. The molecular weight is preferably 500,000 or less because the problem of decreasing the ink ejection property and the like hardly occurs The content (solid content) of the binder (A) in the total amount of the pigment dispersion is preferably 5% to 30% by mass, more preferably 5% to 25% by mass, and still more preferably 5% to 15% by mass.

The binder (A) may be composed of only the urethane resin (A1) or may contain another resin or the like.

Pigment (B)

The pigment (B) is not particularly limited as long as it can be satisfactorily dispersed in the dispersion, but preferably used is a pigment which can be dispersed with an average particle diameter of about 10 to 400 nm (described in detail later). Usable examples thereof include an organic pigment, an inorganic pigment, and a dye, which are used for general ink, coating material, and recording agent.

Examples of the organic pigment include azo-based, phthalocyanine-based, anthraquinone-based, perylene-based, perinone-based, quinacridone-based, thioindigo-based, dioxazine-based, isoindolinone-based, quinophthalone-based, azomethine-azo-based, diketopyrrolopyrrole-based, and isoindoline-based pigments and the like. From the viewpoint of cost and light resistance, copper phthalocyanine is preferably used for an indigo ink.

Examples of the inorganic pigment include carbon black, titanium oxide, zinc oxide, zinc sulfide, barium sulfate, calcium carbonate, chromium oxide, silica, Bengala, mica, and the like. Also, a photoluminescent pigment (Metashine, Nippon Sheet Glass Co., Ltd.) can be used, in which a metal or metal oxide is coated on glass flakes or massive flakes as a base material. In view of coat and coloring power, preferably, titanium oxide is used for a white ink, carbon black is used for a black ink, aluminum is used for a gold or silver ink, and mica is used for a pearl ink.

As described above, the pigment is preferably dispersed with a volume-average particle diameter of 10 to 400 nm in the dispersion. The average particle diameter of the pigment can be measured as the volume-average particle diameter by a known method, such as a dynamic light scattering method or the like, in a state where after the dispersion is produced, the pigment is uniformly dispersed in the dispersion. In particular, the volume-average particle diameter of the dispersion is preferably 10 to 300 nm, more preferably 50 to 200 nm, still more preferably 50 to 150 nm, and particularly preferably 50 nm or more and less than 100 nm. With the volume-average particle diameter of 50 nm or more, aggregation of the pigment can be suppressed when the pigment dispersion is stored. With the volume-average particle diameter of 400 nm or less (particularly preferably 100 nm or less), the ink ejection property is improved.

The content of the pigment in the dispersion is not particularly limited, but is preferably 10% to 30% by mass in the total amount of the dispersion. With the content of less than 10% by mass, the satisfactory ink coloring power may not be obtained by an ink jet ink prepared by diluting the dispersion. In addition, with the content of more than 30% by mass, the pigment may be aggregated during transport or storage of the dispersion, depending on the type of the pigment. In this case, dispersibility with an average particle diameter of 50 to 400 nm cannot be secured. In addition, the ink ejection property may be worsened depending on the degree of dilution.

In the dispersion of the present invention, when the pigment is an organic pigment or carbon black, the concentration of the pigment is preferably 10% to 30% by mass and more preferably 10% to 25% by mass. Within this range, both the ink coloring power and ink ejection property can be preferably satisfied when an ink jet ink is prepared by dilution.

In addition, when the pigment is an inorganic pigment, the content is preferably 25% to 60% by mass and more preferably 30% to 50% by mass.

Aqueous Medium (C)

The pigment dispersion of the present invention further contains the aqueous medium for adjusting to preferred viscosity for pump transportation of the dispersion and filter filtration of the dispersion.

Examples of the aqueous medium (C) include water, an organic medium miscible with water, and a mixture of these.

Examples of the organic solvent miscible with water include alcohol solvents such as methanol, ethanol, n-propanol, isopropanol, and the like; ketone solvents such as acetone, methyl ethyl ketone, and the like; polyalkylene glycols such as ethylene glycol, diethylene glycol, propylene glycol, and the like; alkyl ethers of polyalkylene glycols; lactam solvents such as N-methyl-2-pyrrolidone and the like; and the like. The present invention may use only water, may use a mixture of water and an organic solvent miscible with water, or may use only an organic solvent miscible with water.

In view of the load on safety and environment, the aqueous medium (C) is preferably only water or a mixture of water and an organic solvent miscible with water, and particularly preferably only water.

Other Arbitrary Component

The pigment dispersion of the present invention may contain, in addition to the (A) component, the (B) component, and the (C) component, another arbitrary component within a range which does not impair the effect of the present invention.

Examples of the other component include an amine compound having a boiling point of 100° C. or more, another resin other than the above components, a surfactant, wax, a low-surface-tension organic solvent, a wetting agent, a penetrant, a dispersant other than the above, a defoaming agent, a preservative, a viscosity modifier, q pH adjuster, a chelating agent, a plasticizer, an antioxidant, an ultraviolet absorber, and the like.

Excessive drying of an ink is more suppressed by adding the amine compound having a boiling point of 100° C. or more, and thus nozzle clogging with the ink is prevented. Consequently, the ejection property is improved, and both the ejection property and rubbing resistance can be satisfied.

Examples of the amine compound include polyalkylene imine, polyallylamine, (poly)ethylene polyamine, alkanolamine, alkylamine, and the like.

Among these, alkanolamine is preferred from the viewpoint of pigment dispersibility, odor, and re-solubility.

Polyalkylene imine

The polyalkylene imine is preferably polyalkylene imine having an alkylene group having 2 or more and 5 or less of carbon atoms.

The polyalkylene imine is preferably polyalkylene imine having an alkylene group having 2 or more and 4 or less of carbon atoms, more preferably polyethylene imine or polypropylene imine, and still more preferably polyethylene imine. One or two or more of these may be used.

The number-average molecular weight of the polyalkylene imine is preferably 150 or more, more preferably 500 or more, still more preferably 800 or more, and even still more preferably 1,000 or more, and preferably 10,000 or less, more preferably 5,000 or less, and still more preferably 4,000 or less.

The value of the molecular weight is determined by a method described in examples.

Polyallylamine

The polyallylamine is, for example, a polymer having an amino group in a side chain, such as a homopolymer or copolymer of an allyl compound such as allylamine, dimethylallylamine, or the like.

The weight-average molecular weight of the polyallylamine is preferably 800 or more, more preferably 1,000 or more, and still more preferably 1,500 or more, and is preferably 10,000 or less, more preferably 5,000 or less, and still more preferably 4,000 or less.

Polyethylene polyamine

Examples of the (poly) ethylene polyamine include ethylenediamine, diethylenetriamine, triethylenetetramine, tetraethylenepentamine, pentaethylenehexamine, and the like. Among these, diethylenetriamine, triethylenetetramine, and tetraethylenepentamine are preferred.

Alkanolamine

The alkanolamine is preferably alkanolamine having 2 or more and 9 or less of carbon atoms. Examples of the alkanolamine include primary alkanolamines such as monoethanolamine, monopropanolamine, monobutanolamine, and the like; secondary alkanol amines such as monoalkanol secondary amines, such as N-methylethanolamine, N-methylpropanolamine and the like, dialkanol secondary amines such as diethanolamine, diisopropanolamine, and the like; tertiary alkanol amines such as monoalkanol tertiary amines, such as N,N-dimethylethanolamine, N,N-dimethylpropanolamine, N,N-diethylethanolamine, and the like, dialkanol tertiary amines such as N-methyldiethanolamine, N-ethyldiethanolamine, and the like, trialkanol tertiary amines such as triethanolamine, triisopropanolamine, and the like; and the like. Among these, tertiary alkanol amines having 2 or more and 9 or less of carbon atoms are preferred, and triisopropanolamine is particularly preferred.

Alkylamine

The alkylamine is preferably an alkylamine having 1 or more and 6 or less of carbon atoms. Examples of the alkylamine include primary mines such as propylamine, butylamine, hexylamine, and the like; and secondary amines such as diethylamine, dipropylamine, and the like.

The other resin is preferably an aqueous resin suitable for preparing the pigment dispersion, and preferred examples thereof include resins not corresponding to the components described above, among acrylic resins such as polyvinyl alcohols, polyvinyl pyrrolidones, acrylic acid-acrylate ester copolymer, and the like; styrene-acrylic resins such as styrene-acrylic acid copolymer, styrene-methacrylic acid copolymer, styrene-methacrylic acid-acrylate ester copolymer, styrene-α-methylstyrene-acrylic acid copolymer, styrene-α-methylstyrene-acrylic acid-acrylate ester copolymer, and the like; styrene-maleic acid copolymer, styrene-maleic anhydride copolymer, vinylnaphthalene-acrylic acid copolymer, and salts of these aqueous resins.

Examples of the surfactant include an anionic surfactant, a nonionic surfactant, a cationic surfactant, and an amphoteric surfactant, and among these, an anionic surfactant or a nonionic surfactant is preferred.

Examples of the anionic surfactant include alkylbenzene sulfonate salts, alkylphenyl sulfonate salts, alkylnaphthalene sulfonate salts, higher fatty acid salts, sulfate ester salts of higher fatty acid esters, sulfonate salts of higher fatty acid esters, sulfate ester salts and sulfonate salts of higher alcohol ethers, higher alkyl sulfosuccinate salts, polyoxyethylene alkyl ether carboxylate salts, polyoxyethylene alkyl ether sulfate salts, alkylphosphate salts, polyoxyethylene alkyl ether phosphate salts, and the like. Specific examples thereof include dodecylbenzene sulfonate salts, isopropylnaphthalene sulfonate salts, monobutylphenyl phenol mono-sulfonate salts, monobutylbiphenyl sulfonate salts, dibutylphenyl phenol disulfonate salts, and the like.

Examples of the nonionic surfactant include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamine, polyoxyethylene fatty acid amide, fatty acid alkylolamide, alkylalkanolamide, acetylene glycol, acetylene glycol oxyethylene adduct, polyethylene glycol-polypropylene glycol block copolymer, alkylphenol ethoxylates, and the like. Among these, polyoxyethylene nonylphenyl ether, polyxoyethylene octylphenyl ether, polyoxyethylene dodecylphenyl ether, polyoxyethylene alkyl ether, polyoxyethylene fatty acid esters, sorbitan fatty acid esters, polyoxyethylene sorbitan fatty acid esters, fatty acid alkylolamide, acetylene glycol, acetylene glycol oxyethylene adduct, polyethylene glycol-polypropylene glycol block copolymer, alkylphenol ethoxylates are preferred.

Other usable examples of the surfactant include silicon-based surfactants such as polysiloxane oxyethylene adduct and the like; fluorine-based surfactants such as perfluoroalkyl carboxylate salts, perfluoroalkyl sulfonate salts, oxyethylene perfluoroalkyl ether, and the like; biosurfactants such as spiculisporic acid, rhamnolipid, lysolecithin, and the like; and the like.

These surfactants can be used alone or as a mixture of two or more. In consideration of dissolution stability of the surfactant etc., the HLB thereof is preferably within a range of 7 to 20.

Examples of a commercial fluorine-based surfactant include Novec FC-4430 and FC-4432 (these manufactured by Sumitomo 3M Limited) , Zonyl FSO-100, FSN-100, FS-300, and FSO (these manufactured by DuPont Inc.), Eftop EF-122A, EF-351, 352801, and 802 (manufactured by Jemco Co., Ltd.), Megaface F-470, F-1405, F474, and F-444 (manufactured by DIC Corporation), Surflon S-111, S-112, S-113, S121, S131, S132, S-141, and S-145 (manufactured by Asahi Glass Co., Ltd.), Ftargent series (manufactured by Neos Co., Ltd.), Fluorad FC series (manufactured by Minnesota Mining and Manufacturing Company) , Monflor (Imperial Chemical Industries Ltd.), and Licowet VPF series (Farbwerke-Hoechst AG).

Examples of the silicon-based surfactant include KF-351A, KF-642, Olfine PD-501, Olfine PD-502, and Olfine PD-570 (manufactured by Shin-Etsu Chemical Co., Ltd.), BYK347 and BYK348 (manufactured by BYK Chemie Co., Ltd.), and the like.).

Examples of a polyoxyethylene alkyl ether-based surfactant include BT series (Nikko Chemicals Co., Ltd.), Nonypole series (Sanyo Chemical Industries, Ltd.), D-, P-series (Takemoto Oil & Fat Co., Ltd.), EMALEX DAPE series (Nihon Emulsion Co., Ltd.), and Pegnol series (Toho Chemical Industry Co., Ltd.). Examples of a polyethylene glycol alkyl ester-based surfactant include Pegnol (Toho Chemical Industry Co., Ltd.).

Examples of an acetylene glycol-based surfactant include Olfine E1010, STG and Y (manufactured by Shin-Etsu Chemical Co., Ltd.), and Surfynol 104, 82, 420, 440, 465, 485, and TG (manufactured by Air Products and Chemicals Inc.).

Examples of wax include waxes such as plant/animal waxes such as carnauba wax, candelilla wax, bees wax, rice wax, lanolin, and the like; mineral waxes such as montan wax, ozokerite, and the like; paraffin wax which is a so-called petroleum wax; synthetic waxes such as carbon wax, hoechst wax, polyolefin wax, silicone wax, stearic acid amide, and the like; and natural/synthetic wax emulsions and mixed waxes such as a-olefine-maleic anhydride copolymer; and the like. These waxes have the effect of imparting slippiness to the surface of the formed recorded matter and thus improving rubbing resistance. These waxes can be used alone or as a mixture of a plurality of types. Among these, silicone wax, polyolefin wax, paraffin wax, and the like are preferably used.

Examples of a commercial product of silicone wax include SMS706EX, SM7036EX, SM7060EX, SM7025EX, SM490EX, SM8701EX, SMS709SR, SM8716SR, IE-7045, IE-7046T, SH7024, BY22-744EX, BY22-818EX, FZ-4658, FZ-4634EX, and FZ-4602 (the trade names, manufactured by Toray Dow Corning Co., Ltd.), POLON-MF-14, POLON-MF-14EC, POLON-MF-23, POLON-MF-63, POLON-MF-18T, POLON-MF-56, POLON-MF-49, POLON-MF-33A, POLON-MF-55T, POLON-MF-28T, POLONMF-50, POLON-MK-206, POLON-SR-CONC, KM-9771, KM-9774, KM-2002-T, KM-2002-L-1, KM-9772, KS-7002, KS-701, and X-51-1264 (the trade names, manufactured by Shin-Etsu Chemical Co., Ltd.), and the like.

The polyolefin wax is, for example, wax or copolymer produced from olefin or a derivative thereof, such as ethylene, propylene, butylene, or the like, and examples thereof include polyethylene-based wax, polypropylene-based wax, polybutylene-based wax, and the like. The polyolefin waxes can be used alone or in combination of two or more. Among these, polyethylene-based wax is preferred from the viewpoint of hardly reacting with a crosslinkable group of the urethane resin particles having a crosslinkable group and enabling to improve ejection stability.

Examples of a commercial product of polyolefin wax include AQUACER series such as AQUACER 513 (polyethylene-based wax, average particle diameter: 100 nm or more and 200 nm or less, melting point: 130° C., solid content: 30%), AQUACER 507, AQUACER 515, AQUACER 840, and AQUACER 1547 (the trade names, manufactured by BYK Chemie Japan K. K.), Hitec series such as Hitec E-7025P, Hitec E-2213, Hitec E-6500, Hitec E-6314, Hitec E-9460, Hitec E-9015, Hitec E-4A, Hitec E-5403P, and Hitec E-8217 (the trade names, manufactured by Toho Chemical Industry Co., Ltd., polyethylene-based wax), and the like, Nopcoat PEM-17 (the trade name, manufactured by SAN NOPCO LIMITED, polyethylene emulsion, average particle diameter; 40 nm), ULTRALUBE E-843N (trade name, manufactured by keim additec surface GmbH, polyethylene wax), and the like.

The paraffin wax is so-called petroleum-based wax. The "paraffin" represents an alkane having a number of carbon atoms of 20 or more, and the "paraffin wax" represents a mixture of a linear paraffin-based hydrocarbon having 20 or more and 30 or less of carbon atoms as a main component and a hydrocarbon containing a small amount of isoparaffin and having a molecular weight of about 300 to 500. When an ink contains the paraffin wax, slippiness and water repellency are imparted to a recorded matter, and thus rubbing resistance is improved.

Examples of a commercial product of the paraffin wax include AQUACER 537 and AQUACER 539 (those trade names, manufactured by BYK Chemie Japan K. K.) and the like.

The wax is preferably contained in a fine particle state, that is, an emulsion state or suspension state in the pigment dispersion. Thus, the viscosity of an ink is easily adjusted to be within a range proper for ejection using an ink jet head, and ejection stability and intermittent ejection characteristics during recording can be easily secured.

Examples of a glycol ether compound as a low surface tension organic solvent include diethylene glycol mono (alkyl having 1 to 8 carbon atoms) ether, triethylene glycol mono (alkyl having 1 to 8 carbon atoms) ether, propylene glycol mono (alkyl having 1 to 6 carbon atoms) ether, and dipropylene glycol mono (alkyl having 1 to 6 carbon atoms) ether, and these can be used alone or as a mixture of two or more.

Specific examples thereof include ethylene glycol monomethyl ether, ethylene glycol monoethyl ether, ethylene glycol mono-iso-propyl ether, ethylene glycol monobutyl ether, ethylene glycol mono-tert-butyl ether, diethylene glycol monomethyl ether, diethylene glycol monoethyl ether, diethylene glycol monopropyl ether, diethylene glycol mono-iso-propyl ether, diethylene glycol monobutyl ether, diethylene glycol mono-tert-butyl ether, diethylene glycol monopentyl ether, diethylene glycol monohexyl ether, diethylene glycol monoheptyl ether, diethylene glycol monooctyl ether, triethylene glycol monomethyl ether, triethylene glycol monoethyl ether, triethylene glycol monopropyl ether, triethylene glycol monobutyl ether, triethylene glycol monopentyl ether, triethylene glycol monohexyl ether, triethylene glycol monoheptyl ether, triethylene glycol monooctyl ether, propylene glycol monomethyl ether, propylene glycol monoethyl ether, propylene glycol monopropyl ether, propylene glycol mono-iso-propyl ether, propylene glycol monobutyl ether, propylene glycol mono-tert-butyl ether, propylene glycol monopentyl ether, propylene glycol monohexyl ether, dipropylene glycol monomethyl ether, dipropylene glycol monoethyl ether, dipropylene glycol monopropyl ether, dipropylene glycol mono-iso-propyl ether, dipropylene glycol monobutyl ether, dipropylene glycol monopentyl ether, dipropylene glycol monohexyl ether, and the like.

The glycol ether or the surfactant can be used as a surface tension modifier for adjusting the surface tension of an ink. Specifically, it can be appropriately added so that the surface tension of an ink is 15 mN/m to 30 mN/m or less, and the amount of the surfactant added is preferably within a range of about 0.1% to 10% by mass and more preferably 0.3% to 2% by mass relative to the aqueous pigment dispersion. The surface tension is preferably within a range of 16 mN/m to 28 mN/m and more preferably within a range of 18 mN/m to 25 mN/m.

The wetting agent is not particularly limited, but preferably has miscibility with water and can produce the effect of preventing clogging of a head of an ink jet printer. Examples thereof include diol compounds such as glycerin, ethylene glycol, diethylene glycol, triethylene glycol, polyethylene glycol having a molecular weight of 2000 or less, propylene glycol, dipropylene glycol, tripropylene glycol, 1,3-propylene glycol, isopropylene glycol, isobutylene glycol, 1,2-butanediol, 1,4-butanediol, 1,2-pentanediol, 1,5-pentanediol, 1,2-hexanediol, 1,6-hexanediol, 2-methylpentane-2,4-diol, 1,2-heptanediol, 1,2-nonanediol, 1,2-octanediol, 1,2-hexanediol, 1,2-heptanediol, 1,2-nonanediol, 1,2-octanediol, and the like; 1,4-butanediol, 1,3-butanediol, meso-erythritol, pentaerythritol, nitrogen-containing heterocyclic compounds such as N-methyl-2-pyrrolidone, N-hydroxyethyl-2-pyrrolidone, 2-pyrrolidone, 1,3-dimethylimidazolidinone, ε-caprolactam, and the like; and the like. In particular, the containing of propylene glycol or 1,3-butyl glycol has safety and the effect of improving the ink drying property and ejection performance.

The content of the wetting agent in an ink is preferably 3% to 50% by mass.

Examples of the penetrant include lower alcohols such as ethanol, isopropyl alcohol, and the like; alkyl alcohol ethylene oxide adducts such as ethylene glycol hexyl ether, diethylene glycol butyl ether, and the like; alkyl alcohol propylene oxide adducts such as propylene glycol propyl ether and the like; and the like. The content of the penetrant in the pigment dispersion is preferably 0.01% to 10% by mass.

Method for Producing Pigment Dispersion

In the present invention, a method for producing the pigment dispersion is not particularly limited.

The pigment dispersion may be produced by dispersing the (A) to (C) components and the arbitrary components added according to demand, or may be produced as a pigment dispersion for preparing an aqueous ink jet ink by previously preparing a high pigment concentration pigment dispersion using the (A) and (B) components, a portion of the (C) component, the medium, etc., properly adding arbitrary components, and then diluting with an aqueous medium such as the (C) component or the like. An aqueous pigment dispersion containing a pigment dispersed with a desired volume-average particle diameter can be easily produced by forming the pigment dispersion after the high pigment concentration pigment dispersion is previously prepared by dispersing the pigment using a stirring/dispersing device.

The latter method for producing the pigment dispersion after forming the high pigment concentration pigment dispersion is described below.

Examples of a method for producing the high pigment concentration pigment dispersion include the following methods.

(1) A method of adding a pigment to an aqueous medium containing a pigment dispersant according to demand, and then dispersing the pigment in the aqueous medium by using a stirring/dispersing device, preparing a high pigment concentration pigment dispersion.

(2) A method of kneading a pigment and, if required, a pigment dispersant, using a kneader such as a two-roll mill, a mixer, or the like, adding the resultant kneaded product to an aqueous medium, and then preparing a high pigment concentration pigment dispersion by using a stirring/dispersing device.

(3) A method of adding a pigment to a solution, which is prepared by dissolving a pigment dispersant in an organic solvent having miscibility with water, such as methyl ethyl ketone, tetrahydrofuran, or the like, then dispersing the pigment in the organic solution by using a stirring/dispersing device, then phase-inversion emulsifying the resultant dispersion using an aqueous medium, and distilling off the organic solvent, preparing a high pigment concentration pigment dispersion.

Examples of the stirring/dispersing device include an ultrasonic homogenizer, a high-pressure homogenizer, a paint shaker, a ball mill, a roll mill, a sand mill, a sand grinder, Dyno Mill, Dispermat, a SC mill, Nanomizer, and the like. These devices may be used alone or in combination of two or more.

Ink Jet Ink

The pigment dispersion of the present invention is used and diluted with an aqueous medium so that the pigment content is 1% to 30% by mass, preparing an aqueous ink jet ink. Like in the (C) component, the aqueous medium may be water, a mixture of water and an organic solvent, or an organic solvent alone. The organic solvent is not particularly limited as long as it is miscible with water, and examples thereof include those described above as a "solvent other than water" in the arbitrary components.

In addition, the arbitrary components (for example, a surfactant, a preservative, a surface-tension modifier, etc.) of the pigment dispersion can be contained in the aqueous medium.

Printed Matter

The ink jet ink of the present invention has excellent printing characteristics on various substrates, and thus a printed matter having a plastic substrate and a printing layer with an ink jet ink can be preferably produced.

Examples of the plastic substrate include plastic substrates or laminates thereof, composed of thermoplastic resins, such as polyamide resins such as Ny6, nylon 66, nylon 46, and the like; polyester-based resins such as polyethylene terephthalate, polyethylene naphthalate, polytrimethylene terephthalate, polytrimethylene naphthalate, polybutylene terephthalate, polybutylene naphthalate, and the like; polyhydroxycarboxylic acids such as polylactic acid and the like; biodegradable resins represented by aliphatic polyester-based resins such as poly (ethylene succinate), poly (butylene succinate), and the like; polyolefin resins such as polypropylene, polyethylene, and the like; polyvinyl chloride, polyimide resin, polyacrylate resin, or a mixture thereof, and the like. In particular, a substrate composed of polyester, polyamide, polyethylene, polypropylene, or polyvinyl chloride can be preferably used.

Also, the plastic substrate may be a plastic film. The plastic film may be an unstretched film or a stretched film and a production method thereof is not particularly limited.

16 be particularly preferably used for food packaging because of excellent designability and on-demand printability. Also, the ink jet ink of the present invention has excellent rubbing resistance, and thus a surface-printed matter can be formed by ink jet printing on a surface serving as a front surface.

EXAMPLES

The present invention is described in further below by examples and comparative examples. Hereinafter, "parts" and "%" represent "parts by mass" and "% by mass", respectively, unless otherwise specified.

The binders (1) to (3) used in the examples and comparative binders (1) to (5) are described below.

TABLE 1

| | Binder | | (1) | (2) | (3) |
|---|---|---|---|---|---|
| Urethane resin binder constituent component | Polyol Isocyanate | Structure | Polyester polyol | | |
| | | Structure | Tolylene diisocyanate | | Isophorone diisocyanate |
| | | Ring | Aromatic ring | Aromatic ring | Aliphatic ring |
| | | Ionicity | Anion | Anion | Anion |
| Urethane resin | | Viscosity | 111 | 50 | 40 |
| | | pH | 8.5 | 7.8 | 7.4 |
| | | Tg | −31 | 7 | 49 |
| | | Molecular weight | 49000 | 56000 | 35000 |
| | | MFT | <5 | <5 | 30 |
| | | Acid value mgKOH/g | 18 | 26 | 25 |

TABLE 2

| | Binder | | Comparison (1) | Comparison (2) | Comparison (3) | Comparison (4) | Comparison (5) |
|---|---|---|---|---|---|---|---|
| Urethane resin binder constituent component | Polyol Isocyanate | Structure | Polycarbonate polyol | | Polyether polyol | | Polyester polyol |
| | | Structure | Hydrogenated diphenylmethane diisocyanate No-yellowing type | Isophorone diisocyanate | | | Hexamethylene diisocyanate |
| | | Ring | Aliphatic ring | Aliphatic ring | Aliphatic ring | Aliphatic ring | No ring (aliphatic) |
| | | Ionicity | Anion | Anion | Anion | Anion | Anion |
| Urethane resin | | Viscosity | 85 | 1~100 | 65 | 10~1000 | 610 |
| | | pH | 8.2 | 7~8.5 | 8 | 7~9 | 7.5 |
| | | Tg | −15 | −37° C. | −79 | −80 | 37 |
| | | Molecular weight | 202000 | 39000 | 100000 | 100000 | 30000 |
| | | MFT | <5 | <5 | <5 | <5 | 18 |
| | | Acid value mgKOH/g | 21 | 35 | 22 | 29 | 4 |

In addition, the thickness of the film is not particularly limited, but generally may be within a range of 1 to 500 μm. Also, the printing surface of the film is preferably treated by corona discharge. In addition, silica, alumina, or the like may be vapor-deposited on the printing surface.

The printed matter of the present invention has good printing characteristics on a plastic substrate and can be formed by ink jet printing, and thus can be preferably used as a packaging material. In particular, the printed matter can

PRODUCTION EXAMPLE: Preparation of Pigment Dispersion

A white pigment base having a composition described below was sufficiently stirred and mixed, and then kneaded by using a beads mill (using, as beads, Nikkato Corporation YTZ beads of 1.0 mmϕ, beads filling rate: 80%), and the volume-average particle diameter of a pigment was measured by the same method as described above. Thus, a kneaded base having a volume-average particle diameter of 280 nm was produced.

Titanium oxide JR-600A white pigment (Tayca Corporation) 60 parts
  Nonionic pigment dispersant (BYK Corporation) 10 parts
  Water 30 parts
  Silicon-based defoaming agent (BYK Corporation) 0.1 parts

Preparation of Aqueous Pigment Dispersion for Preparing Aqueous Ink Jet Ink

Aqueous pigment dispersions were prepared according to the composition below so that the pigment concentration of each of the aqueous pigment dispersions was 30% by weight. The binder of each of the examples was used in such an amount that the solid content amount was 10.5% by mass in the total amount of the pigment dispersion.

Pigment kneaded base 50.0 parts
  Binder 20 to 50 parts
  Aqueous medium (B) 10.0 parts
  Water Balance

Preparation of Aqueous Ink Jet Ink for Plastic Substrate

Aqueous ink jet inks for a plastic substrate of Examples 1 to 3 and Comparative Examples 1 to 5 were prepared so that the pigment concentration in each of the aqueous ink jet inks for a plastic substrate was 8% by weight according to the ink composition below.

| | |
|---|---|
| Aqueous pigment dispersion | 4.0 parts |
| Propylene glycol | 10.0 parts |
| 1,2-Hexanediol | 5.0 parts |
| Polyoxyethylene alkyl ether | 0.5 parts |
| Ion exchange water | Balance |

Formation of Printing Film for Evaluation: Ink Jet Printing

The pigment dispersion of each of the examples was filled in an ink cartridge of an ink jet printer (manufactured by Seiko Epson Corporation, MJ-510C) , and a solid pattern was printed on a corona-treated polyethylene terephthalate (PET) film (manufactured by Toyo Boseki K. K., Ester E5100, thickness: 12 μm) or a corona-treated polypropylene (OPP) biaxially stretched film (manufactured by Toyo Boseki K. K., Pylen P2161, thickness: 20 μm) shown in Table 1 and Table 2, dried by a dryer, and then further dried in an oven of 80° C. for 10 minutes, producing a printed matter.

Formation of Printed Matter for Evaluation

The ink composition of each of the examples and the comparative examples was filled in an ink cartridge of an ink jet printer (manufactured by Seiko Epson Corporation, MJ-510C) , and a solid pattern was printed on a corona-treated polyethylene terephthalate (PET) film (manufactured by Toyo Boseki K. K., Ester E5100, thickness: 12 μm) or a corona-treated polypropylene (OPP) biaxially stretched film (manufactured by Toyo Boseki K. K., Pylen F2161, thickness: 20 μm), dried by a dryer, and then further dried in an oven of 90° C for 10 minutes, producing a printed matter.

The resultant printed matters were evaluated by an evaluation method described below. The results are shown in a table below.

Evaluation of Anti-Blocking Property

The film was cut into a size of 4 cm×4 cm and overlapped so that the printing surface and the nonprinting surface of the printed matter were in contact with each other, and a load of 5 Kgf/cm² was applied. Then, the films were allowed to stand for 24 hours in an environment at 50° C. and then the films were separated. In this case, the state of ink transfer (offset) to the nonprinting surface was visually determined based on the area ratio (%) of the offset portion.

A: Transfer to the nonprinting surface is not observed.
  B: Offset transfer is observed at a ratio of as small as less than 5%.
  C: Offset transfer is observed within an allowable range of 5% or more and less than 10%.
  D: Offset transfer is observed at a ratio of 10% or more.

<Evaluation of Laminate Strength>

A laminate was evaluated according to JIS Z 1707:2019. Specifically, evaluation was as follows.

OPP Film

Aromatic and ether-based adhesives (LX401 and SP60, both manufactured by DIC Corporation) were mixed and diluted with ethyl acetate so that the nonvolatile content was 25%, preparing an adhesive for heat sealing. The adhesive was coated at 2 g/m² on the printing surface of an OPP film, and a CCP film (Pylen film-CT P1128, manufactured by Toyo Boseki K. K.) was laminated by a heating roller-type laminate tester set to 40° C. Then, curing was performed at 40° C. for 3 days, forming a laminate film.

A test piece having a width of 10.0±0.1 mm and a development length of 100 mm or more at a right angle was collected from the formed laminate film.

The test piece was opened to 180° at the laminate portion as a center, and the both ends of the test piece with a grip distance of 50 mm or more were attached to the grips of a constant-rate-of-extension tensile testing machine. A tensile load was applied until the laminate portion was broken, and the maximum load (N/10 mm) was determined. The laminate strength was evaluated according to criteria below.

PET Film

The laminate strength was evaluated by the same method as described above except that aliphatic-ester-based adhesives (LX703VL and KR-90, both manufactured by DIC Corporation) were used as a heat seal adhesive, and a LLDPE film (TUX-HC, manufactured by Mitsui Tohcello Inc.) was used as a laminated film.

A: The maximum load (N/10 mm) was 3 or more.
  B: The maximum load (N/10 mm) was 2 to less than 3.
  C: The maximum load (N/10 mm) was 1 to less than 2.
  D: The maximum load (N/10 mm) was 0 to less than 1.

Rubbing Resistance

The rubbing resistance of an OPP film printed matter was evaluated by using a Gakushin-type rubbing fastness tester (manufactured by Tester Sangyo Co., Ltd., AB-301) according to JIS K5701-1:2000. The printed matter was set in the tester, and a dry rubbing test was performed by using PPC paper as rubbing paper under the conditions including a load of 200 g and 100 precipitations, and a wet rubbing test was performed by using canequim No. 3 wet with ion exchange water as frication paper under the conditions including a load of 200 g and 10 precipitations. After the test, the degree of ink peeling in the printed matter was evaluated by visual observation according to evaluation criteria below.

A: No peeling occured in both the dry rubbing test and the wet rubbing test,

B: Peeling was observed at a degree of less than 1% in an inferior one of the dry rubbing test and the wet rubbing test.

C: Peeling was observed at a degree of 1% or more and less than 5% in an inferior one of the dry rubbing test and the wet rubbing test.

D: Peeling was observed at a degree of 5% or more and less than 10% in an inferior one of the dry rubbing test and the wet rubbing test.

Evaluation of Storage Stability

Particle diameter/viscosity change

An accelerated storage stability test was performed by storing each ink for 5 days in a constant-temperature bath of 70° C.

Before and after the accelerated storage stability test, the ink was measured by using a nanoparticle diameter measuring apparatus (Nanotrac wave II Ex150, manufactured by Microtrac Bell Co., Ltd.), and the average particle diameters before and after the accelerated storage stability test were compared.

Before and after the accelerated storage stability test, the ink was measured by using an E-type viscometer (TVE-25L model, manufactured by Toki Sangyo Co., Ltd.), and the viscosities before and after the accelerated storage stability test were compared and evaluated in three levels A to C. The level B or higher was regarded as "acceptable".

A: Rates of change in both average particle diameter and viscosity before and after the accelerated storage stability test were less than 5%.

B: A rate of change in inferior one of the results of the average particle diameter and viscosity before and after the badly accelerated storage stability test was 5% to 15%.

C: A rate of change in inferior one of the results of the average particle diameter and viscosity before and after the badly accelerated storage stability test was over 15%.

Color Change

The accelerated storage stability test was performed by the same method as described above, and then the color was visually confirmed and evaluated in three levels A to C. The level B or higher was regarded as acceptable, A: No color change was observed before and after the test.

B: A slight color change was observed before and after the test.

C: A relatively large color change was observed before and after the test.

The evaluation results of the ink jet inks are shown in a table below.

TABLE 3

| Binder | Example 1 (1) | Example 2 (2) | Example 3 (3) | Comparative Example 1 Comparison (1) | Comparative Example 2 Comparison (2) | Comparative Example 3 Comparison (3) | Comparative Example 4 Comparison (4) | Comparative Example 5 Comparison (5) |
|---|---|---|---|---|---|---|---|---|
| Anti-blocking property | A | A | A | A | A | A | A | A |
| Laminate Strength (OPP) | A | B | B | A | B | B | C | B |
| Laminate Strength (PET) | B | B | A | B | C | A | A | A |
| Rubbing Resistance test | A | A | A | D | D | D | B | D |
| Storage stability (particle diameter/ viscosity change) | A | A | B | A | A | A | C | C |
| Storage stability (color change) | B | A | B | A | A | A | A | A |

It was confirmed that the ink jet inks of Examples 1 to 3 according to the present invention exhibit excellent anti-blocking property and rubbing resistance for a plastic substrate and also exhibits excellent laminate strength when an adhesive is coated on the printing surface and a film is laminated.

On the other hand, unlike the inks of Examples 1 to 3, the aqueous ink jet inks of Comparative Examples 1 to 5 are inferior in any one of the characteristics.

Therefore, it was confirmed that the pigment dispersion of the present invention can be preferably used for an aqueous ink jet ink.

The invention claimed is:

1. A pigment dispersion for ink jet ink, comprising a binder (A), a pigment (B), and an aqueous medium (C), wherein the binder (A) is a binder containing a urethane resin (A1) that is a reaction product of polyol (a1), containing polyol (a1-1) having an acid group selected from the group consist of a carboxyl group and a sulfonate group, and polyester polyol (a1-2) other than the polyol (a1-1), with polyisocyanate (a2) containing polyisocyanate (a2-1) having an aromatic ring structure;

the acid groups possessed by the urethane resin (A1) are partially or entirely neutralized;

the glass transition temperature of the urethane resin (A1) is 70° C. or less, the urethane resin (A1) having a mass-average molecular weight within a range of 35,000 to 100,000; and wherein the reaction of the polyol (a1) with the polyisocyanate (a2) is performed so that the equivalent ratio of isocyanate groups of the polyisocyanate (a2) to hydroxyl groups of the polyol (a1) is within a range of 0.8 to 2.5.

2. The pigment dispersion for inkjet according to claim 1, wherein the acid value of the urethane resin (A1) is 10 to 40 mgKOH/g.

3. The pigment dispersion for ink jet ink according to claim 1, wherein the content of the binder (A) is 5% to 30% by mass in the total amount of the pigment dispersion.

4. The pigment dispersion for ink jet ink according to claim 1, the pigment dispersion being used for printing on a plastic substrate.

5. An ink jet ink comprising the pigment dispersion for ink jet ink according to claim 1.

6. A printed matter printed with the ink jet ink according to claim 5.

7. The pigment dispersion for ink jet ink according to claim 2, wherein the minimum film-forming temperature (MFT) of the urethane resin (A1) is 40° C. or less.

8. The pigment dispersion for ink jet ink according to claim 7, wherein the urethane resin (A1) contains a ring structure in an amount of 500 to 5,000 mmol/kg based on the entire urethane resin (A1).

9. The pigment dispersion for ink jet ink according to claim 1, wherein the carboxyl group is selected from the group consisting of 2,2-dimethylolpropionic acid, 2,2-dimethylolbutanoic acid and 2,2-dimethylolvaleric acid.

10. The pigment dispersion for ink jet ink according to claim 1, wherein the sulfonate group is selected from the group consisting of 5-sulfoisophthalic acid, sulfoterephthalic acid, 4-sulfophthalic acid and 5-(4-sulfophenoxy) isophthalic acid.

11. The pigment dispersion for ink jet ink according to claim 1, wherein the polyester polyol (a1-2) comprises a structural unit derived from a polyvalent carboxylic acid and a structural unit derived from a polyhydric alcohol, the polyvalent carboxylic acid is selected from the group consisting of phthalic acid, isophthalic acid, terephthalic acid, adipic acid, maleic acid, fumaric acid, succinic acid, oxalic acid, malonic acid, glutaric acid, pimelic acid, suberic acid, azelaic acid, sebacic acid, dimer acid, trimellitic acid, benzene tetracarboxylic acid, benzene pentacarboxylic acid and benzene hexacarboxylic acid: and the polyhydric alcohol is selected from the group consisting of ethylene glycol, propylene glycol, 1,3-propanediol, 1,4-butanediol, 1,5-pentanediol, 1,6-hexanediol, diethylene glycol, triethylene glycol, tetraethylene glycol, dipropylene glycol, tripropylene glycol, 1,4-cyclohexanediol, 1,4-cyclohexane dimethanol, and the like; glycols having a branched structure, such as 2-methyl-1,5-pentanediol, 3-methyl-1,5-pentanediol, 1,2-butanediol, 1,3-butanediol, 2-butyl-2-ethyl-1,3-propanediol, 1,2-propanediol, 2-methyl-1,3-propanediol, neopentyl glycol, 2-isopropyl-1,4-butanediol, 2,4-dimethyl-1, 5-pentanediol, 2, 4-diethyl-1,5-pentanediol, 2-ethyl-1, 3-hexaneddiol, 2-ethyl-1,6-hexanediol, 3,5-heptanediol, 2-methyl-1, 8-octanediol, glycerin, trimethylolpropane, trimethylolethane, pentaerythritol and sorbitol.

12. The pigment dispersion for ink jet ink according to claim 1, wherein the polyisocyanate (a2-1) having an aromatic ring structure is selected from the group consisting of 4,4-diphenylmethane diisocyanate, 2,4 1-diphenylmethane diisocyanate, carbodiimide-modified diphenylmethane diisocyanate, crude diphenylmethane diisocyanate, phenylene diisocyanate, tolylene diisocyanate, naphthalene diisocyanate, xylylene diisocyanate and tetramethylxylylene diisocyanate.

* * * * *